United States Patent
Rudland

(10) Patent No.: US 8,837,283 B2
(45) Date of Patent: Sep. 16, 2014

(54) MOBILE NODE ASSIGNEMENT TO A ROUTER IN A WPAN STIMULATION

(75) Inventor: Philip Andrew Rudland, Sunderland (GB)

(73) Assignee: Koninklijke Philips N.V., Eindhoven (NL)

(*) Notice: Subject to any disclaimer, the term of this patent is extended or adjusted under 35 U.S.C. 154(b) by 249 days.

(21) Appl. No.: 13/395,511

(22) PCT Filed: Sep. 2, 2010

(86) PCT No.: PCT/IB2010/053949
§ 371 (c)(1),
(2), (4) Date: Mar. 12, 2012

(87) PCT Pub. No.: WO2011/030262
PCT Pub. Date: Mar. 17, 2011

(65) Prior Publication Data
US 2012/0176986 A1    Jul. 12, 2012

(30) Foreign Application Priority Data
Sep. 11, 2009 (EP) .................................. 09305832

(51) Int. Cl.
*H04L 1/00* (2006.01)
*H04L 12/28* (2006.01)
*H04W 4/00* (2009.01)
*H04W 40/24* (2009.01)
*H04L 12/26* (2006.01)
*H04L 12/24* (2006.01)

(52) U.S. Cl.
CPC ......... *H04W 40/248* (2013.01); *H04L 43/0811* (2013.01); *H04L 41/12* (2013.01)

USPC ............ 370/230; 370/254; 370/338; 370/400

(58) Field of Classification Search
USPC ................. 370/229–231, 235–238, 310–350, 370/389–392, 400–402, 242–246, 248, 370/250–252, 254–258; 455/445–465
See application file for complete search history.

(56) References Cited

U.S. PATENT DOCUMENTS 7,706,301 B2 *   4/2010   Petrescu et al. ............... 370/254
7,848,278 B2 *  12/2010   Chen et al. .................... 370/328

(Continued)

OTHER PUBLICATIONS

IEEE Recommended Practice for Information Technology-Telecommunications and Information Exchange Between Systems-Local and Metropolitan Area Networks Specific Requirements Part 15:5: Mesh Topology Capability in Wireless Personal Area Networks(WPANs); IEEE Computer Society, IEEE Std 802.15.5 2009, Piscataway, NJ, USA, May 8, 2009, pp. 1-166.

*Primary Examiner* — Tri H Phan
(74) *Attorney, Agent, or Firm* — Larry Liberchuk

(57) ABSTRACT

A method and system to assign a mobile node to a router in a wireless multihop mesh network. A request from a mobile node to join the network is received. A server is notified of the request to join the network, and transmits a positive response to the mobile node upon establishing a connecting between the mobile node and network, and then generates an association record between the mobile node and a router. The association record is then recorded and it is determined if a previous association record exists between the mobile node and at least one other router. If previous association record exists, then a message to suppress any association record between the mobile node and the at least one other router is sent.

16 Claims, 3 Drawing Sheets

(56) References Cited

U.S. PATENT DOCUMENTS

| | | |
|---|---|---|
| 8,081,583 B2 * | 12/2011 | Ruy et al. .................. 370/256 |
| 2008/0063002 A1 * | 3/2008 | Zheng et al. .................. 370/401 |
| 2008/0293413 A1 * | 11/2008 | Sharif-Ahmadi et al. . 455/435.1 |
| 2009/0147699 A1 | 6/2009 | Ruy |
| 2011/0176487 A1 * | 7/2011 | Zhai ............................ 370/328 |
| 2011/0211219 A1 * | 9/2011 | Bradley et al. ............... 358/1.15 |
| 2012/0078981 A1 * | 3/2012 | Gradin et al. ................. 707/812 |
| 2012/0155349 A1 * | 6/2012 | Bajic et al. ................... 370/311 |

\* cited by examiner

MOBILE NODE ASSIGNEMENT TO A ROUTER IN A WPAN STIMULATION

FIELD OF THE INVENTION

The invention relates to the field of wireless multihop mesh networks, such as a ZigBee network and more particularly to a method for assigning a mobile node to a router in such a network.

BACKGROUND OF THE INVENTION

ZigBee is a new standard for low cost, low power wireless connectivity based on the IEEE 802.15.4-2003 standard. It is particularly well suited to installed infrastructure deployments, such as building automation, and applications involving with a large number of battery powered sensors interconnected via a backbone of mains power ZigBee routers.

A traditional ZigBee network is able to handle some amount of mobility, such that it can cope if a router is moved or goes down, or if a small number of devices are mobile within the whole environment. When a device moves it acquires a new parent, and sends a broadcast message telling the old parent that it can delete the old record of it.

However in a very large or busy ZigBee network, or in a network made up of multiple sub-networks, the commands to remove records have a strong chance of failing to reach the old parent. Therefore, in a traditional ZigBee network, every time a node gets a new parent there is a strong chance that the record of it stored by the old parent will not get removed properly. Consequently, a lot of old records are left lying around. This uses a lot of memory, which quickly becomes full on a low cost device.

SUMMARY OF THE INVENTION

Therefore, it would advantageous to achieve a method in which, when a mobile node moves to another parent, the record stored by the old parent is always removed.

To better address one or more concerns, in a first aspect of the invention, a method to assign a mobile node to a router in a wireless multihop mesh network, the network comprising a plurality of routers, comprises:
  in a first router:
    receiving from the mobile node a request to join the network; then
    informing a server that the mobile node has joined or attempted to join the network; and
    sending to the mobile node a positive response and recording the connection of the mobile node; and
  in the server:
    recording an association record between the mobile node and the router; and
    if an association record already exists between the mobile node and another router, sending a message to the other router for suppressing any connection record between the mobile node and the other router.

As the backend server centralizes all associations between mobile nodes and routers, it is able to notice any link that is no longer active.

In a second aspect of the invention a server in a wireless multihop mesh network, the network comprising a plurality of routers, comprises:
  an interface for communicating with the routers;
  a mobile node manager comprising a mobile node memory and, on reception of a message sent by a first router informing that a mobile node has joined or attempted to join the network, configured for,
    recording in the mobile node memory an association record between the mobile node and the router; and
    if an association already exists between the mobile node and another router, sending a message to the other router for suppressing any connection record between the mobile node and the other router.

In a third aspect of the invention a computer software product stored on a recording media comprises a set of instructions to enable a computer to practice the here above method when the computer executes the set of instructions.

Depending on the particularity of the network and/or the mobile nodes, a particular embodiment may be preferred as easier to adapt or as giving a better result. Aspects of these particular embodiments may be combined or modified as appropriate or desired, however.

BRIEF DESCRIPTION OF THE DRAWINGS

These and other aspects of the invention will be apparent from and elucidated with reference to the embodiment described hereafter where.

DETAILED DESCRIPTION OF THE INVENTION

Figure 1:
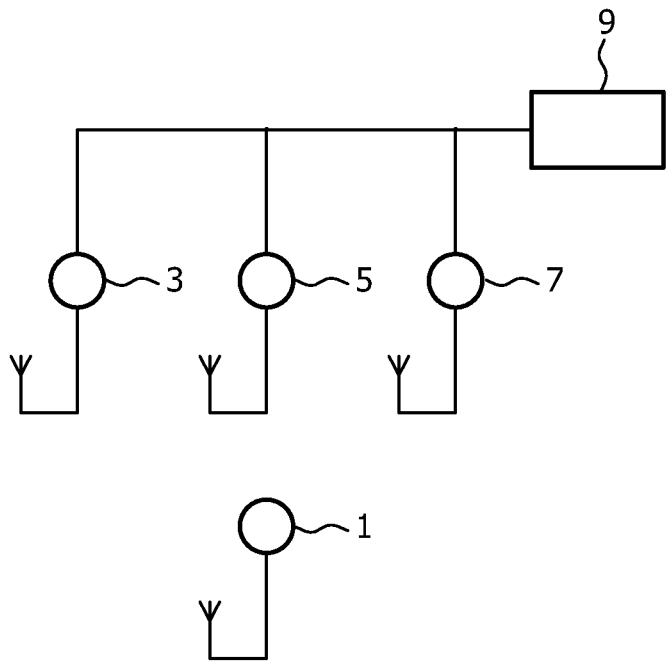
FIG. 1 is a schematic view of a wireless network.

In reference to FIG. 1, a wireless multihop mesh personal area network, such as ZigBee network, comprises a mobile node 1, a plurality of routers 3, 5, 7 and a backend server 9. The mobile node 1 connects through a wireless connection to the routers. The routers 3, 5, 7 are connected to the backend server 9 via an Ethernet connection, for instance.

The mobile node 1 is powered by a battery and the ZigBee protocol is thus adapted to preserve the electric consumption of the mobile node 1. The mobile node 1 comprises, for instance, a microprocessor with memory, a ZigBee transceiver and a battery. The routers 3, 5, 7 are fixed devices, powered by an electric line. For instance, the routers 3, 5, 7 comprise a microprocessor with memory, a ZigBee radio transceiver, a mains power supply and an Ethernet interface. The backend server 9 comprises an Ethernet interface and a processing unit, for instance a microprocessor with memory.

Figure 2:
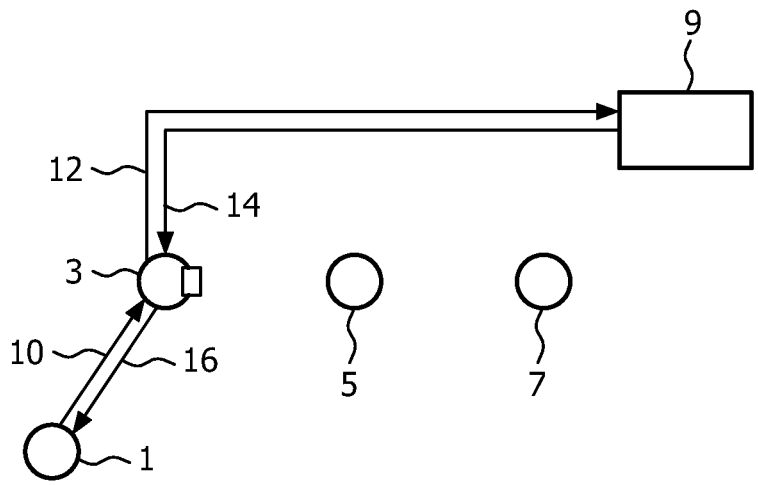
FIGS. 2, 3 and 4 are schematic views of a method for assigning a mobile node to a router according to the prior art.
Figure 3:
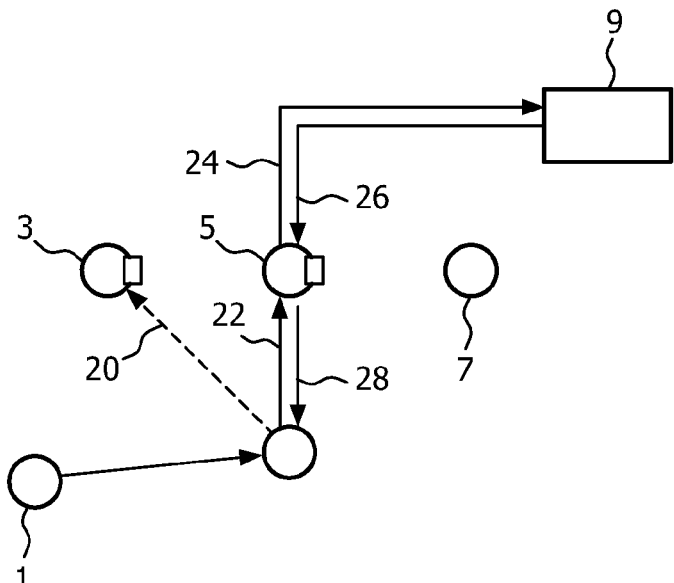
Figure 4:
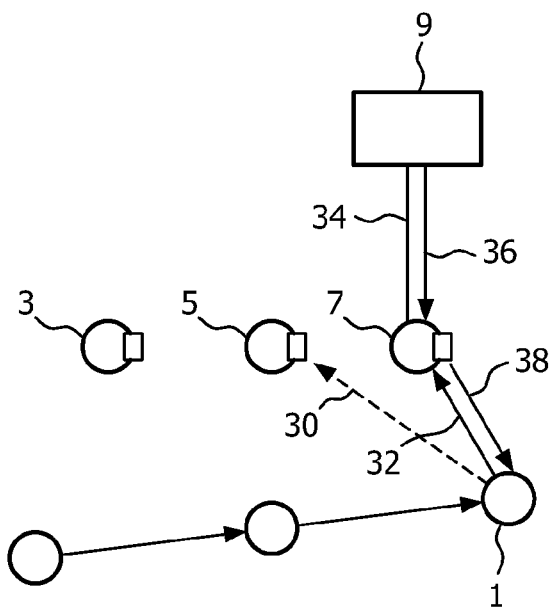

FIGS. 2-4 illustrate the prior art. In FIG. 2, the mobile node 1 joins the network at the router 3. To join the network, the mobile network sends, step 10 a request to join, the router 3 checks permission, step 12, from the backend server 9. If the backend server 9 knows the mobile node 1, it sends, step 14, to the router 3 a positive response. Then, the router 3 sends, step 16, a response to join to the mobile network 1.

At FIG. 3, the mobile node 1 has moved far away from the router 3 and has detected, step 20, that the link with the router 3 is no longer functional. As, the mobile node 1 is within connection distance of router 5, it sends, step 22, a request to rejoin. The router 5 checks permission, steps 24, 26, as explained here above, and sends, step 28, a rejoin response to the mobile node 1. As the mobile node 1 has no means for informing the router 3 that the link is no longer active, the router 3 keeps in its memory a record of the mobile node link.

At FIG. 4, the mobile node 1 has continued to move and is now in the vicinity of the router 7, out of sight of the router 5. The same method disclosed here above, is used by the mobile node 1 to rejoin the network at the router 7 level, steps 30, 32, 34, 36, 38.

Figure 5:
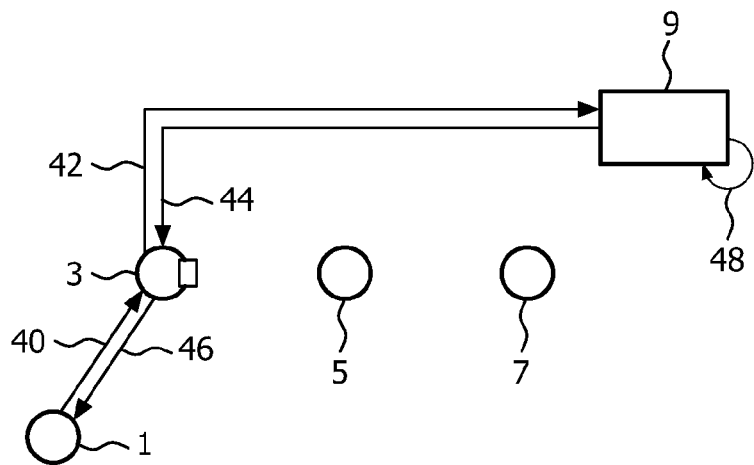
FIGS. 5, 6 are schematic views of a method for assigning a mobile node to a router according to an embodiment of the invention.
Figure 6:
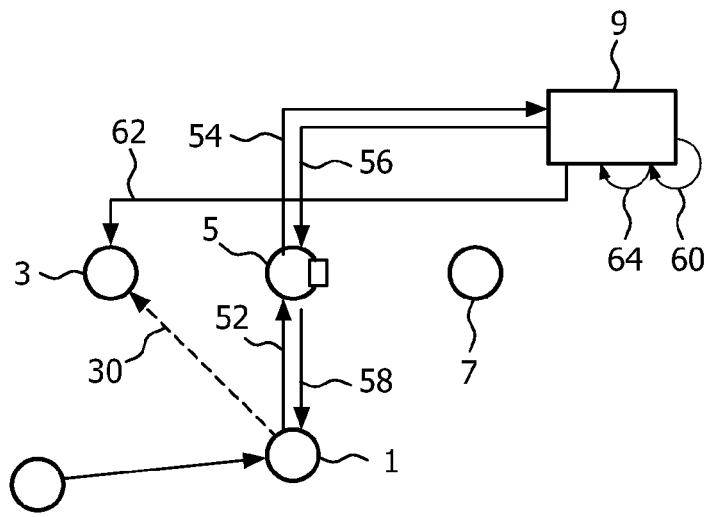

FIGS. 5-6 illustrate a method according to an embodiment of the invention.

In reference with FIG. 5, the mobile node 1 joins the network at the router 3. To join the network, the mobile network sends, step 40 a request to join, the router 3 checks permission, step 42, from the backend server 9. If the backend server 9 knows the mobile node 1, it sends, step 44, to the router 3 a positive response. Then, the router 3 sends, step 46, a response to join to the mobile network 1. The backend server 9 records, step 48, an association between the mobile node 1 and the router 3.

The mobile node 1 moves, FIG. 6, far away from the router 3 and has detected, step 50, that the link with the router 3 is no longer functional. As, the mobile node 1 is within connection distance of router 5, it sends, step 52, a request to rejoin. The router 5 checks permission, steps 54, 56, as explained here above, and sends, step 58, a rejoin response to the mobile node 1. The backend server, in parallel, checks its database and notices, step 60, that an association already exists between the mobile node 1 and the router 3. The backend server 9 thus sends a message, step 62, to the router 3 for suppressing any record of a connection between the router 3 and the mobile node 1 and updates, step 64, the association with the reference to the router 5.

As the backend server centralizes all associations between mobile nodes and routers, it is able to notice any link that is no longer active.

Figure 7:
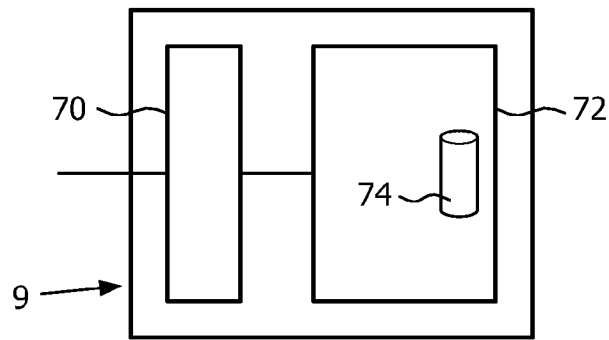
FIG. 7 is a schematic view of a server according to an embodiment of the invention.

Schematically, the server 9 comprises, FIG. 7:
an interface 70 for communicating with the routers;
a mobile node manager 72 comprising a mobile node memory 74 and, on reception of a message sent by a first router informing that a mobile node has joined or attempted to join the network, configured for,
  recording in the mobile node memory an association record between the mobile node and the router; and
  if an association already exists between the mobile node and another router, sending a message to the other router for suppressing any connection record between the mobile node and the other router.

In a ZigBee network, the request to join/rejoin is typically based on a "MAC association" command or a "network rejoin" command, both of which are responded locally, on a provisional basis, with an "association response" command or a "rejoin response" command respectively. The router sends an "update device" command to the trust center ("TC"), usually on the ZigBee Coordinator ("ZC"). The TC verifies that the mobile node is authorized to join the network by looking it up in its local tables. Then a "transport key" passes from the TC to the router then from the router to the mobile node, after which it has the "network key" which enables it to operate on the network. Alternatively, a "remove device" message is sent from the TC to the router and the router sends a "leave" command to the mobile node. However, if the mobile node rejoins to the same network and thus already has the network key, the router does not need to wait for approval from the TC: the update message is sent but no transport key is needed. Therefore, in a particular embodiment for a ZigBee method, it is possible to use the "update" command to trigger the management of the association records and the deletion of the connection records in the other routers, if applicable.

In another embodiment, the system may also remove records of child nodes that are no longer active, but haven't moved to a new parent, for example, because the battery failed or the node was taken off site.

Some mobile nodes send periodic messages, also called "heartbeats", to the backend server to inform the server they are still active. If heartbeats are missed for some time, then the backend server sends a "remove device" command to the parent router to remove the mobile node.

As the child must be aware that if its heartbeats fail for a sustained period then it might be removed from the network, the heartbeats are acknowledged by the backend server. As such, if a child node doesn't have a heartbeat acknowledged for some period then it knows it may have been removed, and may have to rejoin again.

This feature may be important in a safety network such as, for instance, a network of panic buttons in which each mobile node, i.e. panic button, must be connected almost permanently to transmit an alarm. Indeed, this feature enables a mobile node to attempt to find a parent that is currently able to communicate with the alarm system as soon as the mobile node detects the non-reception.

Using a pseudo programmatic language, the method may be implemented in each node type as follows:

For the mobile node 1:
1. join network
2. send heartbeat message via parent router
3. check for acknowledgement
4. if acknowledgement is not received then
   a. scan for a possible new parent router
   b. if a possible new parent router is detected then send it a rejoin request
5. repeat from 2 regularly.

For the routers 3, 5, 7:
1. start network
2. if a mobile node sends a join/rejoin request then
   a. Check permissions with the server
   b. If Ok then add a record for this mobile node and send a rejoin response
3. if a mobile node sends a heartbeat message then
   a. Check that it has a record for this mobile node
   b. If so then send the heartbeat on to the server
4. If the server sends an acknowledgement to the heartbeat message
   a. Pass on the acknowledgement to the mobile node
5. if the server sends a Remove device message
   a. remove the record for this mobile node
6. check for events 2, 3, 4 and 5 continuously.

For the server 9:
1. construct a record of known devices including all the mobile nodes permitted to access the network, and when they were last heard from (initially null), and the mobile node's parent router (initially null)
2. if a router checks permissions then
   a. check if the specified mobile node is known
   b. if so reply Ok
   c. if the mobile node's old parent router was not null (and is different from the new parent router) then send a remove device message to the old parent router
   d. store the identity of the mobile node's new parent router
3. if a router passes on a heartbeat message from a mobile node then
   a. update the record of when this mobile node was last heard from
   b. send an acknowledgement back via the router
4. if the time since any mobile node sent a heartbeat message exceeds a threshold a. send a remove device message to the mobile node's parent router
b. set the identity of the mobile node's parent router to null.
5. check for events 2, 3 and 4 continuously.

The method may be implemented by a computer program product that is able to implement any of the method steps as described above when loaded and run on computer means. The computer program may be stored/distributed on a suitable medium supplied together with or as a part of other hardware, but may also be distributed in other forms, such as via the Internet or other wired or wireless telecommunication systems.

An integrated circuit may be arranged to perform any of the method steps in accordance with the disclosed embodiments.

While the invention has been illustrated and described in details in the drawings and foregoing description, such illustration and description are to be considered illustrative or exemplary and not restrictive; the invention is not limited to the disclosed embodiment.

For instance, the server receiving the heartbeats and the backend server may be different servers. In that case, the backend server is informed by the other server of the fact that no heartbeat has been received for a predetermined duration.

The connection between the server and the routers may be an Ethernet connection, a ZigBee connection or any other connection suitable to transfer data in a relatively fast manner.

The mobile node may be powered by any electrical means such as mains power.

The routers may also be mobile nodes, and may themselves be children of other routers.

Typically, there is just one server for all nodes. However, in specific system, it is possible to have more than one server, perhaps operating independently in order to server different applications. For instance, a panic button system may have one server and an asset tracking system may have a different server whilst managing the same set of mobile nodes.

For safety reasons, the server may be duplicated with a failover server.

The "heartbeat" may be any message that a mobile node is able to send regularly. For example, a server may use an existing command or mechanism such as the "ZigBee Cluster Library attribute reporting mechanism" to configure a mobile node to send messages on a regular basis. As such, the mobile node does not need to be modified to implement the embodiments disclosed here above.

In some system, the server may be implemented on the same physical device as one of the routers.

The ZigBee protocol has been used as a typical embodiment of the assignment of a mobile node to a router using the invention. However, the invention is not limited to this protocol and may be used in other wireless networks.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. A method to assign a mobile node to a router in a wireless multihop mesh network, the method comprising:
    receiving a request from a mobile node to join the network;
    notifying a server of the request to join the network;
    transmitting a positive response to the mobile node upon establishing a connection between the mobile node and network and generating an association record between the mobile node and a router;
    recording the association record; and
    if a previous association record exists between the mobile node and at least one other router, sending a message to the at least one other router to suppress any association record between the mobile node and the at least one other router.

2. The method of claim 1, further comprising:
    transmitting an update message at periodic time intervals from the mobile node for updating the association record.

3. The method of claim 2, further comprising:
    deleting the association record if an update message is not received within a predetermined time interval; and
    transmitting a message to the router for cancelling the connection with the mobile node and suppressing any association record of the connection.

4. The method of claim 2, further comprising:
    transmitting a response to the mobile node upon receiving an update message from the mobile node;
    determining if the mobile node received the response within a predetermined time interval; and
    transmitting a new request to join the network from the mobile node if the response was not received within the predetermined time interval.

5. The method of claim 2, wherein the update message comprises a heartbeat message that is transmitted from the mobile node at periodic time intervals to update the association record.

6. The system of claim 5, wherein the update message is configured to update the association record with a time that the update message was received.

7. A server in a wireless multihop mesh network, the network comprising a plurality of routers, the server comprising:
    an interface for communicating with the routers;
    a mobile node manager comprising a mobile node memory, the mobile node manager configured to:
        receive notification of a request by a mobile node to join the network via a router;
        recording an association record between the mobile node and the router; and
        if a previous association record exists between the mobile node and at least one other router, sending a message to the at least one other router to suppress any association record between the mobile node and the at least one other router.

8. The server of claim 7, further comprising:
    receiving an update message at periodic time intervals from the mobile node via the router for updating the association record.

9. The server of claim 8, wherein if the update message is not received within a predetermined time interval, the mobile node manager is configured to delete the association record between the mobile node and the router and to send a message to the router for cancelling a connection with the mobile node and suppressing any association record of the connection.

10. The server of claim 8, further comprising:
    the mobile node manager configured to:
        transmit a response to the mobile node upon receiving the update message from the mobile node;
        determine if the mobile node received the response within a predetermined time interval; and
        receive a new request to join the network from the mobile node if the response was not received within the predetermined time interval.

11. A system, comprising:

a wireless multihop mesh network, the network comprising a plurality of routers and at least one server, at least one of the plurality of routers and at least one of the at least one server comprising:

a processor and a memory adapted to store computer executable instructions, the computer executable instructions that when executed cause the processor to:

receive a request from a mobile node to join the network;

notify the at least one server of the request to join the network;

transmit a positive response to the mobile node upon establishing a connection between the mobile node and network, and generate an association record between the mobile node and a router;

record the association record; and if a previous association record exists between the mobile node and at least one other router, transmit a message to the at least one other router to suppress any association record between the mobile node and the at least one other router.

12. The system of claim 11, further comprising computer executable instructions that when executed cause the processor to:

transmit an update message at periodic time intervals from the mobile node to update the association record.

13. The system of claim 12, wherein the update message comprises a heartbeat message that is transmitted from the mobile node at the periodic time intervals to update the association record.

14. The system of claim 13, wherein the update message is configured to update the association record with a time that the update message was received.

15. The system of claim 12, further comprising computer executable instructions that when executed cause the processor to:

delete the association record if an update message is not received within a predetermined time interval; and transmit a message to the router to cancel the connection with the mobile node and suppress any association record of the connection.

16. The system of claim 12, further comprising computer executable instructions that when executed cause the processor to:

transmit a response to the mobile node upon receiving the update message from the mobile node;

determine if the mobile node received the response within a predetermined time interval; and transmit a new request to join the network from the mobile node if the response was not received within the predetermined time interval.

* * * * *